March 14, 1961 R. R. WALTON 2,974,394
MACHINE FOR PROCESSING FIBROUS MATERIALS
Filed Nov. 22, 1957 5 Sheets-Sheet 1
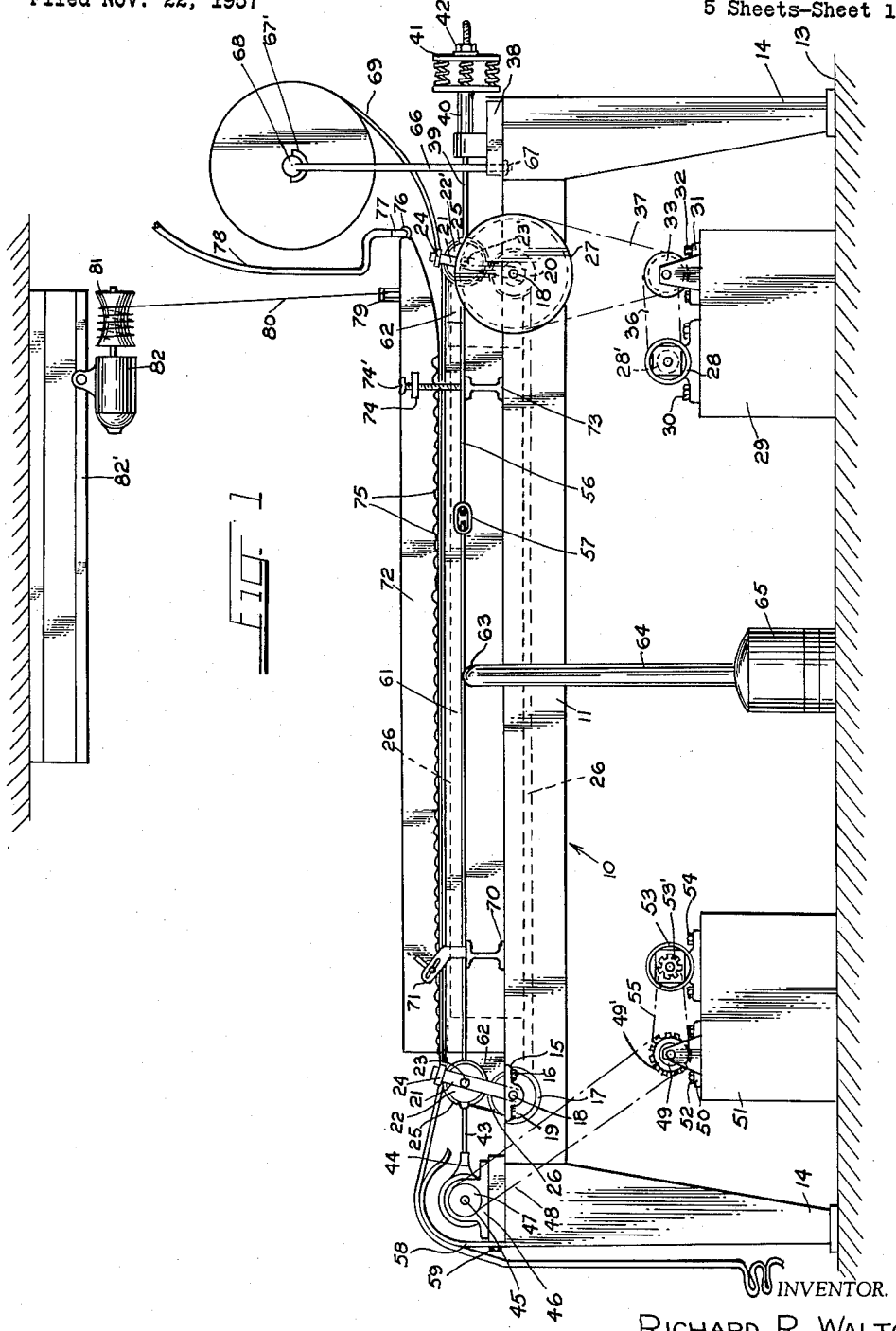
INVENTOR.
RICHARD R. WALTON
BY

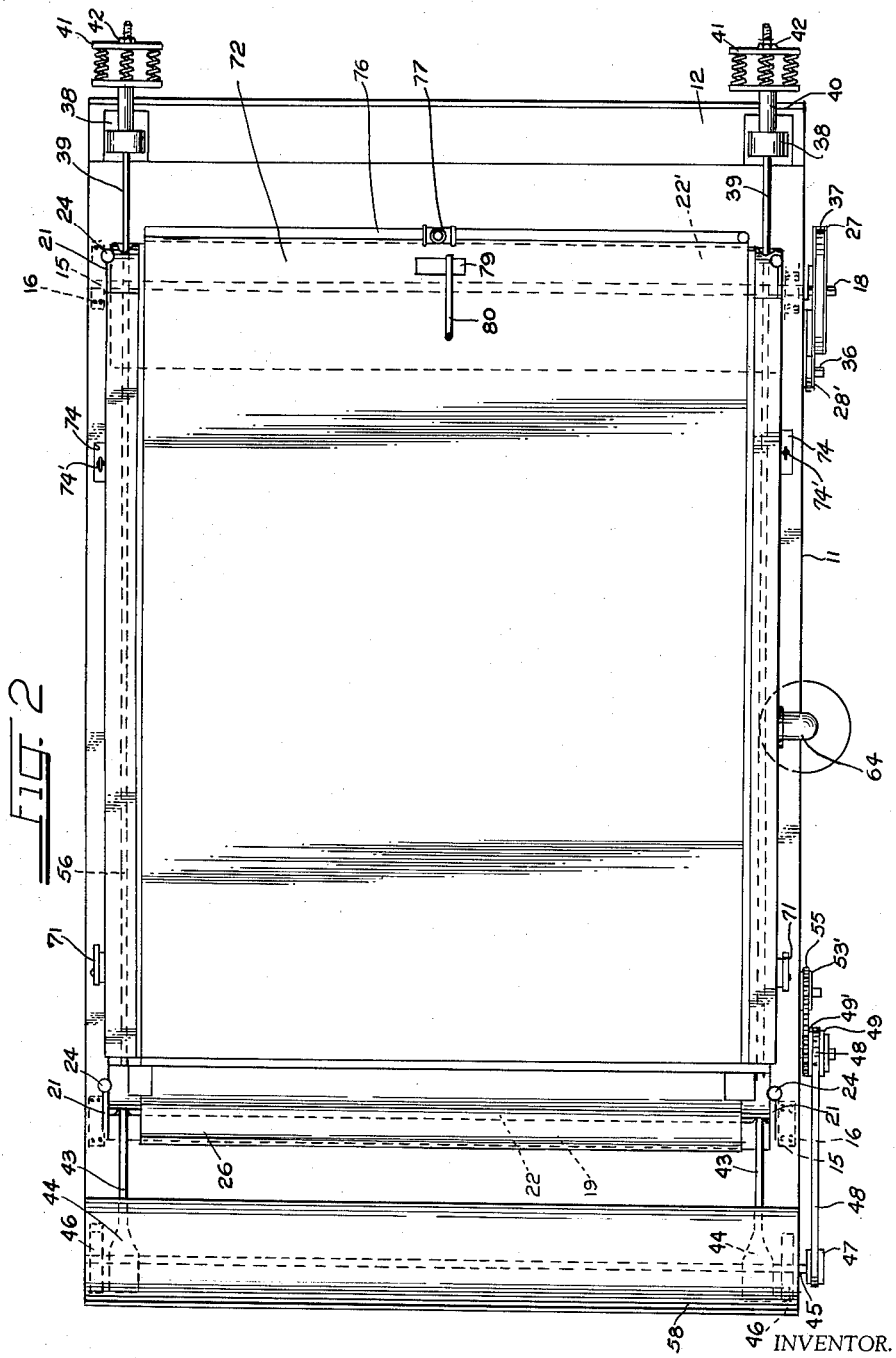

March 14, 1961 R. R. WALTON 2,974,394
MACHINE FOR PROCESSING FIBROUS MATERIALS
Filed Nov. 22, 1957 5 Sheets-Sheet 3
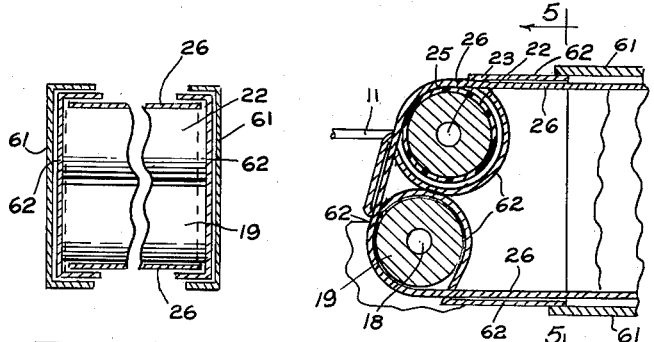
Fig. 5
Fig. 4
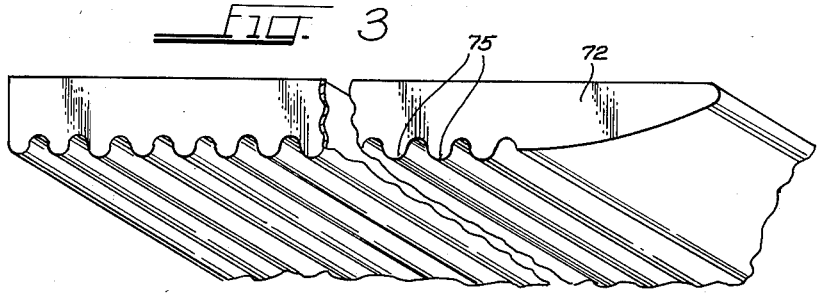
Fig. 3
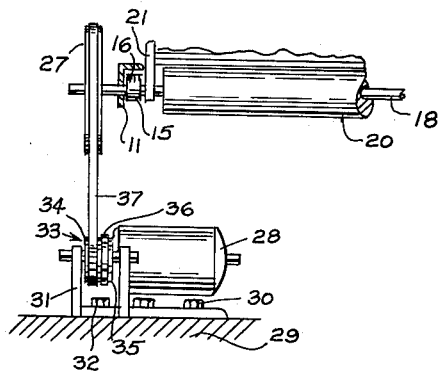
Fig. 6
INVENTOR.
RICHARD R. WALTON
BY
ATT'Y.

March 14, 1961 R. R. WALTON 2,974,394
MACHINE FOR PROCESSING FIBROUS MATERIALS
Filed Nov. 22, 1957 5 Sheets-Sheet 4
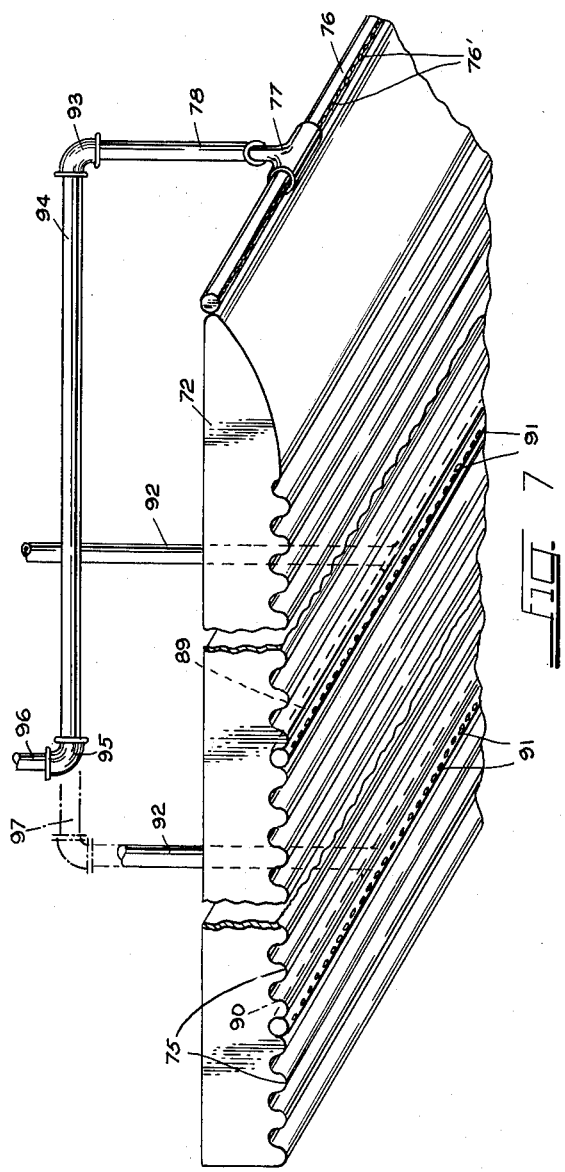
INVENTOR.
RICHARD R. WALTON
BY
Atty.

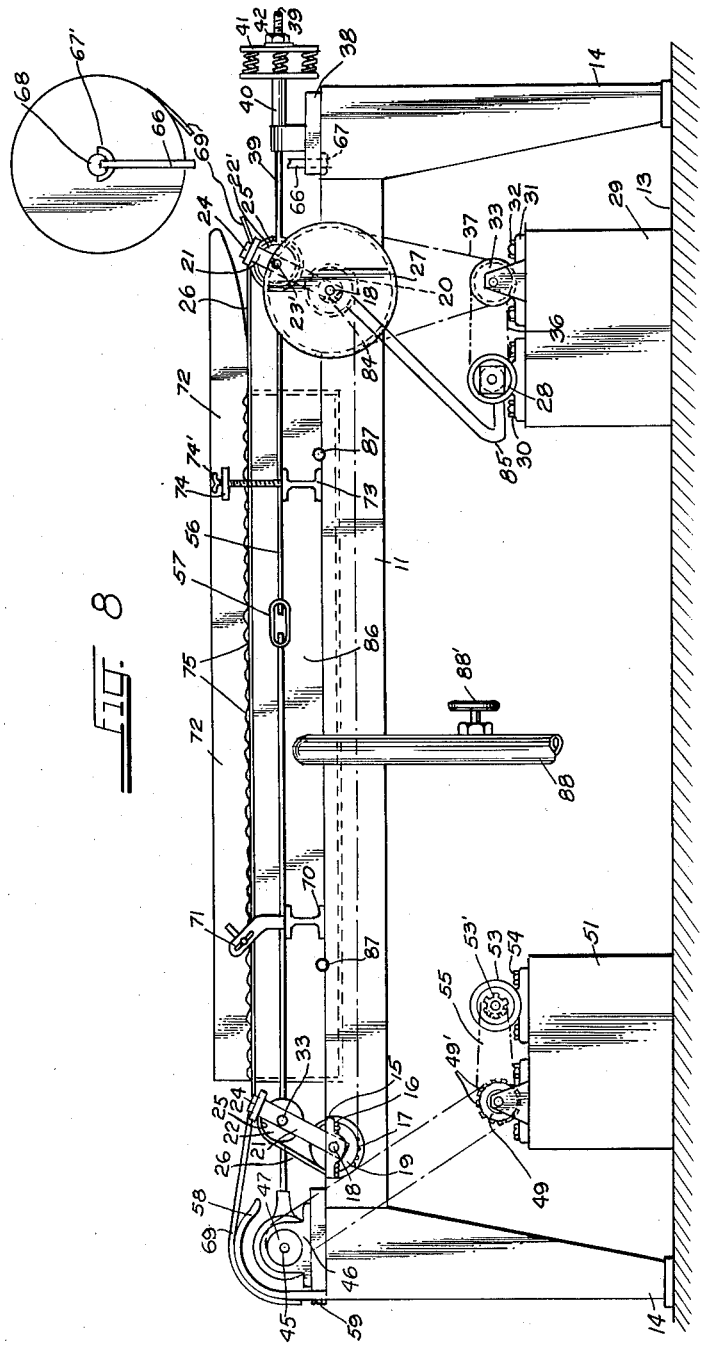

United States Patent Office 2,974,394
Patented Mar. 14, 1961

2,974,394
MACHINE FOR PROCESSING FIBROUS MATERIALS

Richard R. Walton, 10 West Hill Place, Boston, Mass.

Filed Nov. 22, 1957, Ser. No. 698,150

14 Claims. (Cl. 28—14)

My invention relates to a machine and a method for processing fibrous materials, adopted particularly for the felting, dyeing and/or washing of such materials.

Since the manufacture of felt is one of the uses of this invention, it will be described basically in this connection, and in relation to the special problems involved therein, although it will be understood that it is also applicable, at least in part, to other treatment of such materials, such as dyeing and/or washing, as above indicated or to such treatment of other materials. Therefore, it will be understood that, for convenience, I will use the term "processing" to include the above.

Commonly, in producing felts from batts of carded fibers, two major steps, known, respectively, as hardening and fulling, are employed, each of which is performed by a separate machine. Each of said machines is limited in its usefulness and capacity, in that it cannot operate upon a continuous flow of the material, but rather acts upon segregated batches thereof.

Most hardening machines now in use consist of a lower fixed platen and a heavy mobile upper platen. A single batt or, in some instances, a number of batts are placed between the upper and lower platens. Heat, moisture and pressure are applied to the batts and the upper platen is caused to vibrate rapidly in a lateral course. The action of the upper platen, in conjunction with the heat and moisture applied to the batts, causes them to become hardened, increasing their tensile strength.

After a batt has been hardened, it is removed from the hardening machine and placed in a fulling machine. The fulling machine commonly employed in the felting industry is of the hammer-type. The hammer-type machine consists of a bowl or tub above which are suspended hammers, consisting of a series of vertical shafts with a foot or "kicker" on the end of each of them. The batt is placed in a roll against one side of the bowl or tub and the hammers are caused to oscillate, striking the roll of material and compressing it, thus causing the material to be fulled.

The general object of my invention is to provide a machine and method which eliminate or, to a great extent overcome, the disadvantages of the ordinary hardening and fulling machines and methods by performing these functions in a continuous, rather than a batch, operation.

It is another object of the invention to provide a machine of this character which may also be used for dyeing and/or washing fibrous materials or fabrics.

A further object is to provide a machine and method whereby hardening, fulling, washing and dyeing, or any one or combination of these steps, may be accomplished in one continuous operation.

Another object of my invention is to provide a felt-hardening machine which is lighter and more compact than the hardening machine now in use.

A more particular object of my invention is to provide a machine and process by which the fabric to be processed is conducted past an irregular surface, a processing liquid is applied thereto at an apropriate point or points in its course of travel, pressure is applied to press the fabric against said irregular surface and the material is subjected to vibratory motion while travelling in pressure contact with said surface.

Other objects and advantages of my machine and methods will be apparent from the following description, taken in connection with the accompanying drawings, in which:

Fig. 1 is a side elevation of a preferred embodiment of my machine;

Fig. 2 is a top plan view thereof;

Fig. 3 is an enlarged bottom perspective, partially broken away, of platen employed in the machine;

Fig. 4 is a detailed sectional view of one end of an air chamber, a roller and a drum and a pair of rollers used in such machine;

Fig. 5 is a detailed cross-sectional view taken substantially on section line 5—5 in Fig. 4, looking in the direction of the arrows;

Fig. 6 is a detailed view of a power train by which one of said rollers is driven;

Fig. 7 is a view, similar to Fig. 3, of the platen, showing an arrangement of pipes whereby water and/or other fluids may be conducted to the platen;

Fig. 8 is a side elevation of a modification of my machine.

Referring first to Fig. 1, the machine of my invention, as illustrated in this figure, is assembled upon a frame shown generally at 10. Said frame includes side members 11, formed of angle iron or other suitable girders, and end members 12 of like construction. The frame as shown is of a rectangular shape, the exact form and dimensions thereof being dictated by the results desired, the nature of which will be more fully explained hereinafter. The frame is supported from a floor or other surface, indicated by the reference numeral 13, by means of legs 14 located at each corner of the frame.

At each end of each side member 11 there is located a bearing 15 affixed to the horizontal flange of the angle iron 11, as by bolts 16. Each bearing 15 is so positioned as to be directly opposite the bearing located on the corresponding end of the opposite side member. Appropriate segments 17 of the vertical portion of each side member are cut away to allow axles 18 to extend therethrough and be accommodated in the bearings 15.

The axles 18 at opposite ends of the machine carry rollers 19 and 20, respectively, which are positioned on said axles between the side members 11. Positioned inboard of the side members 11 are four arms 21. One arm 21 is pivotally mounted on each end of each of said axles 18. Said arms 21 accommodate fixed drums 22 and 22', affixed thereto by means of axles 23 and 23' and bolts 24. The drums 22 and 22' at opposite ends of the machine are so positioned as to allow clearance between said drums 22 and 22' and the rollers 19 and 20, respectively.

An endless carrier belt 26, made of canvas or other suitable material and impregnated with rubber to make it impervious to water, soaps, detergents, dyestuffs, acids and other chemicals which might be used in the production of felt, is coursed around the rollers 19 and 20 and the drum 22 and 22'. The belt 26 is driven by the roller 20.

A Teflon covering 25 is affixed to the fixed drums 22 and 22'. The belt 26, as it is caused to be drawn over the drums 22 and 22', tends to rub particles of the Teflon from the coverings 25. The particles so rubbed off tend to coat the underside of the belt 26, and after the belt has been coursed over the covering 25 for a time, a Teflon to Teflon contact is established between the coverings 25 and the belt 26.

A pulley 27 is affixed to the axle 18 which carries the roller 20. A source of power, such as an electric motor 28, is secured upon a stand 29, as by bolts 30. A pulley mounting 31, which accommodates a double faced pulley 33 (best shown in Fig. 6) is likewise secured to the stand 29 by bolts 32. One face 34 of the pulley is located beneath the face of the pulley 27 and is on a vertical plane therewith, whereas the other face 35 of the pulley is aligned on a horizontal line with the face of a pulley 28′ (see Fig. 2) attached to the motor 28.

A V-belt 36 connecting the pulley 28′ and the face 35 of the pulley 33 and another V-belt 37 connecting the face 34 of the pulley 33 and the axle pulley 27 transmit power from motor 28 to the roller 20, which in turn drives the belt 26. As viewed in Fig. 1, the motor causes the belt to be propelled in a counterclockwise direction.

Couplings (not shown) are located at either end of the axle 23′ and inboard from the end of the drum 22′. Located at either end of the end section 12 located closest to the drum 22′ and aligned with said couplings are L-shaped plates 38, the vertical portion of each is provided with a hole (not shown) to allow a rod 39 to pass therethrough.

Each of the rods 39 is attached to one of the couplings on axle 23′, extends through one of the plates 38, through a sleeve 40 and a spring cluster 41. A nut 42, screwed upon the free end of the rod 39 secures said rod through the spring cluster 41.

Couplings (also not shown), similar to and positioned in a like manner as those attached to the axle 23′, are attached to axle 23. Each of these couplings is attached to a rod 43 which is fastened to an eccentric 44. The eccentrics 44 are fixed to an axle 45 which passes through bearings 46 affixed to either end of the end member 12. One end of the axle 45 extends beyond the end member 12 and has a pulley 47 affixed thereto.

A V-belt 48 extends from the pulley 47 to a pulley 49 situated in a mounting 50 which is attached to a stand 51 as by bolts 52 (see Figs. 1 and 2). Integrated with the pulley 49 and situated therewith in the mounting 50 is a chain sprocket 49′. An electric motor 53, equipped with a chain sprocket 53′, is also attached to the stand 51, as by bolts 54. A chain 55 transmits power from the motor 53 to the sprocket 49′, which in turn transmits the power to the pulley 49 integrated therewith. The V-belt 48 conducts the power from the pulley 49 to the pulley 47, which in turn causes the axle 43 and the eccentrics affixed thereto to turn. The action of the eccentrics is transmitted to the drum 22 by means of the rods 43. The action of the drum 22, over which the belt 26 is coursed, imparts lengthwise vibratory motion to said belt.

It has been found from experimentation that the frequency and amplitude of such motion may vary considerably, depending to a large extent upon the material being processed and the results desired. However, as an example, a batt composed of 70 parts of wool and 30 parts of rayon, and whose finished weight was 6½ ounces per square yard, was successfully felted by subjecting it to motions whose frequency was 1250 per minute, and whose amplitude was on the order of 5/16 of an inch.

The spring clusters 41 cause the belt 26 to be held taut as the eccentrics impart thereto the lengthwise vibratory motion above referred to. To eliminate, to a substantial degree, excess vibration caused by the action of the eccentrics and thus reduce wear on parts such as the belt 26, the axles 23 and 23′ are connected at each of their ends by a rod 56, provided with a turnbuckle 57 along its length, to allow for proper adjustment between the axles 23 and 23′.

A guard or shield 58, composed of sheet metal or other suitable material and being of a general semi-circular configuration, extends the width of that end section 12 to which the bearings 46 are attached and is attached thereto as by bolts 59. This guard covers the axle 45 and eccentrics 44, and serves to protect workmen, employed within the general vicinity of the machine, from any danger associated with these moving parts.

U-shaped members of sheet metal 61 extend on either side of the mid-section of the belt 26 in the area between the roller 19 and the drum 22 at one end of the machine and the roller 20 and drum 22′, the edges of the belt 26 being coursed under the lips of the members 61 and 62 (see Fig. 5). The members 61 are joined internally by rods (not shown) extending between the upper and lower levels of the belt 26.

Telescopic end portions 62 (see Fig. 4), shaped in such manner as to fit about the roller 19 and drum 22 at one end, and the roller 20 and the drum 22′ at the other end, and provided with lips similar to those of the members 61, serve to complete an air chamber formed within the belt 26. The position of the belt 26 in relation to the members 61 and 62 is best illustrated by Fig. 5. The belt is flexible so that the central portions thereof may be distended under pressure applied as hereinafter described.

On one of the members 61 is located an opening provided with a grommet 63 so that a pipe 64, which is connected to an air pump 65, is blown into the chamber formed by the members 61 and 62, lending support to, and serving to distend, the mid-portion of the belt 26. The chamber is not completely air-tight, but provides a sufficient enclosure for the amount of pressure required.

As will be apparent from the description set forth hereinafter, the preferred amount of pressure exerted upon the belt 26, by the air within the chamber, will vary in accordance with certain variables, such as the weight of the material being processed by the machine and the results desired. It has been found from experimentation, that the normal desired range of pressure in the chamber will be from .4 of an inch of water pressure to .9 of an inch of water pressure for most normal operations; however, it is not inconceivable that circumstances might arise where a pressure equal to as much as 5 inches of water pressure might be desired.

Were the machine of my invention to be incorporated into a completely continuous system of felt manufacture, the material, such as a batt, could be directed thereinto immediately upon leaving a carding or webbing machine. However, for convenience in illustration I have shown the source of the material as a roll thereof mounted at one end of the machine. Figs. 1 and 8 show two vertical posts 66 fastened, as by bolts 67, upon the end member 12 at the right-hand end of the machine as viewed in the drawings. One post 66 is fastened to either end of said end member 12. The free end of each of the posts is provided with a semi-circular recess or rest 67′, which accommodates a supply spool 68 around which is wrapped the material, such as a fibre batt 69, which is to be processed by the machine.

In accordance with my invention, a pivotally mounted platen 72 is positioned above the upper reach of the belt 26. It is pivotally connected near one end to brackets 71 (see Figs. 1 and 8) which are fixed to I-beams 70 supported by the members 11 at each side of the machine. Another pair of I-beams, marked 73, are similarly supported on the frame near the other end of the platen. A stop plate 74 is affixed at either side of the platen 72 and has a set screw 74′ threaded therethrough. The stop plates 74 are so positioned on the platen 72 that when the latter is in a lowered position, as shown in Fig. 1, the set screws contact the beams 73 and thus support the right-hand end of the platen. By adjusting the set screws 74′, it is possible to hold this end of the platen at any desired distance from the belt 26.

The platen 72 is constructed generally of sheet metal or other suitable material formed over a wooden frame (not shown). That area of the platen immediately contiguous to the belt 26 is embossed or corrugated, yet is made of a smooth surface material to provide a low coefficient of friction. Protrusions or corrugations 75 on the face of the platen contact the fibers of the batt 69 or other material, and urge them into a more intimate relationship during the felting operation, which results from the above described vibratory motion, with the material held against the platen by a pressure applied to the belt. The action of the corrugations 75 on the fibers causes the batt to be both hardened and fulled while being conducted beneath the platen 72. Thus, the single operation of this machine performs both of those operations normally performed by a hardening and fulling machine respectively. Since this machine relies not on the weight of a platen, but rather on the the air pressure exerted on the belt 26 and the action of the corrugations 75 for hardening and fulling the batt 69, and since this same machine also hardens and fulls the batt without need of hammers, common in ordinary fulling machines, it weighs a great deal less than either the ordinary hardening or fulling machine, and is much more compact than the ordinary fulling machine.

Since air pressure is employed to force the belt 26 toward the platen 72 until pressure contact is made between the platen 72 and the batt 69, any distortion of the corrugated surface, due to warping or other factors, is compensated for by the air pressure, so that the entire corrugated surface is constantly in touch with the batt 69.

That end of the platen 72 at which the batt 69 or other material is introduced thereunder is tapered and without corrugations to allow the batt 69 to be easily introduced between the platen 72 and belt 26. At the apex of the tapered portion of the platen there is located a sprinkling or wetting device, such as a sprinkler pipe 76, which is provided with holes 76' (see Fig. 7) and which extends across the width of the platen. A T-joint 77 located in the center of pipe 76 connects the pipe with a hose 78 or other suitable means for conducting liquid thereto.

The platen may be raised or lowered by means of a cable 80 connected to a U-bolt 79 on the top of the platen. The cable 80 is connected to a pulley 81 driven by a hoist motor 82 which is shown as suspended from a beam 82'. The hoist motor may be operated and controlled by any suitable means (not shown).

In operation the batt 69, or other material is led onto the belt 26 and a felting fluid, such as hot water or a water and acid mixture is sprayed thereon from the sprinkling pipe 76 (through a suitable control, not shown), thus wetting the material. The wetting of the batt 69 causes an immediate reduction in the thickness thereof, and causes it to cling quite firmly to the belt 26.

The platen 72 is raised a sufficient distance from the belt 26 to allow one end of the batt 69 to be placed in that position on the belt where, upon lowering the platen, the end of the batt 69 will be between the corrugations 75 and the belt. The belt is caused to move while being subjected to vibratory motion in a manner heretofore described. As the batt 69 is continually drawn beneath the platen 72 by the action of the belt 26, the batt is continually wetted by fluid from the sprinkler pipe 76. The fluid so sprayed on the batt acts as a lubricant between the fibers, and aids the action of the corrugations 75 in urging said fibers into a more intimate relationship.

Since the corrugations 75, in conjunction with the felting fluid, act to bring about the desired felting, the greater the area of such corrugations in contact with the batt 69, the more rapidly will the felting action take place. To increase the felting action of the batt in contact with the corrugations 75, the amplitude of the vibratory motion, the frequency of such motion, or the length of the platen 72 may be increased. It will be understood that by doubling the amplitude of the vibrations without increasing the speed of the belt's travel, the felting action will be doubled because the batt will be moved under twice as many corrugations of the platen. It becomes clear that the greater number of corrugations that the batt is passed under the greater will be the felting action, since each corrugation forms a projection for the batt to be worked against.

Fig. 8 depicts a modification of my machine, and, since in general it is similar to the machine depicted in Fig. 1, the reference numerals used to indicate the elements of the machine of Fig. 1 will be employed in Fig. 8, with the exception of those applied to elements appearing in Fig. 8 which do not appear in Fig. 1.

As has been heretofore explained, different types of materials and the different results desired dictate the amount of processing time, and the frequency and amplitude of the vibratory motion transmitted to the belt 26. In certain instances, the use of eccentrics to effect the vibration of the belt may not be as advantageous as other means.

The machine as shown in Fig. 8 is equipped with a rotary limit switch 84, attached to the axle 18 at the right-hand end of the machine and connected by wires 85 to the motor 28, which causes the motor to reverse its direction after a given interval. This action of the motor causes the belt 26 to reverse its direction of travel. The limit switch is so adjusted as to allow the motor 28 to travel a greater distance forward than reverse in any given cycle, so that at all times the belt 26 is driven in a general forward direction. The limit switch is employed only when the desired amplitude of the vibratory motion is greater than may well be imparted by means of eccentrics. Normally, when the limit switch is being employed, power to the eccentrics is shut off.

Still referring to Fig. 8, the machine there shown is equipped with an open-top water container 86, supported by means of rods 87, on the side members 11. The container is disposed between the drums 22 and 22' beneath that portion of the belt 26 positioned immediately below the platen 72, the open top thereof being immediately under the upper reach of the belt 26. A pipe 88, provided with a valve 88' is connected into the bottom portion of the container 86, and conducts water from a source (not shown) into the container 86. By this modification, it is possible to support the belt 26 beneath the platen 72 by means of liquid pressure rather than air pressure. It is, of course, to be understood that the pressure of the liquid in the container 86 will be similar to that employed in the air chamber shown in the machine depicted in Fig. 1.

Fig. 7 shows a platen 72 having secondary sprinkler pipes 89 and 90 incorporated therein. These pipes and the platen are provided with holes 91 through which liquid may be sprinkled onto the batt 69 carried by the belt.

The pipes 89 and 90 are connected to pipes 92 for conducting liquid thereto. As is shown in Fig. 7, the conduit 78 which conducts liquid to the sprinkler pipe 76 is joined by an elbow 93 to a pipe 94 equipped with another elbow 95 which connects with an intake pipe 96. I have shown in phantom a connection 97 which could be made between the pipe 92 and pipe 94, so that a liquid from a common source could be conducted to pipes 76 and 90, if desired; the pipe 92 could be supplied from a separate source if a different liquid is to be used at this outlet.

By employing a platen 72 modified as shown in Fig. 7, it is possible to treat the material in many different ways as it is being conducted through the machine.

The following are examples of treatments to which a material being conducted through the machine could be subjected to:

*Example I*

By introducing felting fluid into pipe 76, washing solution into pipe 89 and water into pipe 90, it is possible to felt, wash and rinse the material, in a single operation.

Example II

By introducing felting fluid into pipe 76, washing solution into pipe 89 and dye into pipe 90, it is possible to felt, wash and dye the material in a single operation.

Example III

By introducing felting fluid into pipe 76, solvent into pipe 89 and water into pipe 90, it is possible to felt, scrub and rinse the material in a single operation.

It should be understood that any single operation or combination of operations could be performed by the machine at one time, provided that the platen were provided with sufficient secondary sprinkler pipes to conduct the liquids necessary for such operations to the material.

Since certain changes may be made in machines and methods described above without departing from the spirit and scope of the invention, it is intended that all matter shown in the accompanying drawings and described hereinabove shall be interpreted as illustrative and not in a limiting sense.

I claim:

1. A fabric processing machine, comprising a belt upon which the fabric may be carried, means for driving said belt, a platen located above the belt and having an irregular surface for contacting the fabric, a fluid chamber located below the belt in such relation thereto that fluid in said chamber may apply pressure to the underside of the belt to press the fabric on the top thereof against said platen, means for introducing fluid into the chamber to apply such pressure, means for vibrating the belt as it travels beneath the platen, and means for applying a liquid to the fabric so that it is in moist condition while being pressed and vibrated against said platen.

2. A felting machine, comprising a belt upon which material to be felted may be carried, means for driving said belt, a corrugated platen operatively located immediately above said belt, means for sprinkling a liquid on said material, a fluid chamber positioned immediately beneath the belt in the area below said platen, means for introducing a fluid into said chamber to yieldably support and apply pressure to the belt and thus press the material against the platen, and means for imparting vibratory motion to said belt as it travels beneath said platen.

3. A felting machine, comprising a belt upon which material to be felted may be carried, means for driving said belt, an embossed platen operatively located immediately above said belt, means for sprinkling a liquid on said material, a fluid chamber positioned immediately beneath the belt in the area below said platen, means for introducing a fluid into said chamber to yieldably support and apply pressure to the belt and thus press the material against the platen, and means for imparting lengthwise vibratory motion to said belt as it travels beneath said platen.

4. A felting machine, comprising a belt upon which material to be felted may be carried, an embossed platen operatively positioned parallel and immediately adjacent to said belt, an air chamber beneath that portion of the belt located immediately beneath said platen, means for introducing air into said chamber to yieldably support and apply pressure to said belt and thus press the material against said platen, means for driving said belt, means for sprinkling a liquid on said material, and means for transmitting lengthwise vibratory motion to said belt as it travels beneath said platen.

5. A felting and washing machine, comprising a belt upon which material to be felted and washed may be carried, means for driving said belt, a corrugated platen operatively located immediately above said belt, means positioned near the point of entry of the material beneath said platen for sprinkling a felting liquid on said material, means positioned further along said platen for applying a washing liquid to said material, a fluid chamber positioned immediately beneath the belt in the area below said platen, means for introducing a fluid into said chamber to yieldably support and apply pressure to the belt and thus press the material against the platen, and means for imparting lengthwise vibratory motion to said belt as it travels beneath said platen.

6. A felting, washing and dyeing machine, comprising a belt upon which material to be felted, washed and dyed may be carried, means for driving said belt, a corrugated platen operatively located immediately above said belt, means positioned near the point of entry of the material beneath said platen for sprinkling a felting liquid on said material, means positioned further along the length of said platen for applying a washing liquid to said material, means also positioned along the length of said platen for applying a dyeing liquid to said material, a fluid chamber positioned immediately beneath the belt in the area below said platen, means for introducing a fluid into said chamber to yieldably support and apply pressure to the belt and thus press the material against the platen, and means for imparting lengthwise vibratory motion to said belt as it travels beneath said platen.

7. A washing machine, comprising a belt upon which material to be washed may be carried, means for driving said belt, a corrugated platen operatively located immediately above said belt, means positioned near the point of entry of the material beneath said platen for sprinkling a washing liquid on said material, a fluid chamber positioned immediately beneath the belt in the area below said platen, means for introducing a fluid into said chamber to yieldably support and apply pressure to the belt and thus press the material against the platen, and means for imparting lengthwise vibratory motion to said belt as it travels beneath said platen.

8. A washing and dyeing machine, comprising a belt upon which material to be washed and dyed may be carried, means for driving said belt, a corrugated platen operatively located immediately above said belt, means for applying a washing liquid to said material, means for applying a dyeing liquid to said material, a fluid chamber positioned immediately beneath the belt in the area below said platen, means for introducing a fluid into said chamber to yieldably support and apply pressure to the belt and thus press the material against the platen, and means for imparting lengthwise vibratory motion to said belt as it travels beneath said platen.

9. A dyeing machine, comprising a belt upon which material to be dyed may be carried, means for driving said belt, a corrugated platen operatively located immediately above said belt, means for applying a dyeing liquid to said material, a fluid chamber positioned immediately beneath the belt in the area below said platen, means for introducing a fluid into said chamber to yieldably support and apply pressure to the belt and thus press the material against the platen, and means for imparting lengthwise vibratory motion to said belt as it travels beneath said platen.

10. A fabric processing machine comprising: a frame upon which such machine is assembled; a pair of rollers extending the width of said machine located at either end of said frame; axles, upon which said rollers are mounted, extending beyond the ends of said rollers; means for fastening said axles to said frame; power means connected to one of said axles for driving the roller connected thereto; posts pivotally mounted on said axles outboard of either end of said rollers; fixed drums mounted upon said pivotally mounted posts; a spring tension means connected to one of said fixed drums; an eccentric positioned at that end of the frame opposite said spring tension means; power means for driving said eccentric; means for coupling said eccentric to that fixed drum not joined to said spring tension means; an endless belt coursed about said rollers and fixed drums; a fluid chamber positioned immediately beneath the belt in the area below said platen; means for introducing a fluid into said air chamber; pivotal means carried by said frame; a corrugated platen attached to said pivotal means and operably located immediately adjacent to the upper side of said belt; power means for pivotally lifting said platen; and sprinkling means located at one end of said platen.

11. A fabric processing machine comprising: a frame upon which such machine is assembled; a pair of rollers extending the width of said machine located at either end of said frame; axles, upon which said rollers are mounted; extending beyond the ends of said rollers; means for fastening said axles to said frame; power means connected to one of said axles for driving the roller connected thereto; posts pivotally mounted on said axles outboard of either end of said rollers; fixed drums mounted upon said pivotally mounted posts; a spring tension means connected to one of said fixed drums; an eccentric positioned at that end of the frame opposite said spring tension means; power means for driving said eccentric; means for coupling said eccentric to that fixed drum not joined to said spring tension means; an endless belt coursed about said rollers and fixed drums; an air chamber formed about the open side portions of said belt; means of such configuration as to fit around said rollers and fixed rollers at either end of said belt, telescopically mounted into said air chamber; means for introducing air into said air chamber; pivotal means carried by said frame; a corrugated platen attached to said pivotal means and operably located immediately adjacent to the upper side of said belt; and sprinkling means located at one end of said platen.

12. A fabric processing machine, comprising a belt upon which the fabric may be carried, means for driving said belt, a platen pivotally located above the belt and having an irregular surface for contacting the fabric, a hoist suspended above said platen, means for attaching the platen to said hoist, a fluid chamber located below the belt and in such relation thereto that fluid in said chamber may apply pressure to the underside of the belt to press the fabric on the top thereof against said platen, means for introducing fluid into the chamber to apply such pressure, means for vibrating the belt as it travels beneath the platen, and means for applying a liquid to the fabric so that it is in moist condition while being pressed and vibrated against said platen.

13. A machine for processing fibrous material, comprising a flexible, traveling conveyor onto which said material is fed, means for saturating the material with a processing liquid, a stationary element adjacent to the surface of said conveyor, said element having a series of material-engaging projections thereon, a vibrating mechanism arranged to act upon said conveyor for vibrating same substantially in its own plane, and means for applying uniform, yielding, fluid pressure to a face of said conveyor to press same and the material carried thereby against said projections.

14. A machine for processing fibrous material, comprising a flexible, traveling conveyor onto which said material is fed, means for saturating the material with a processing liquid, a stationary element adjacent to the surface of said conveyor, said element having a series of material-engaging projections thereon, a vibrating mechanism arranged to act upon said conveyor for vibrating same substantially in its own plane, and means for applying uniform, yielding, fluid pressure to a face of said conveyor to press same and the material carried thereby against said projections, each thereof forming a working surface whereby the more of said projections that are passed over by the material on each vibration of the conveyor the greater the action upon said material.

References Cited in the file of this patent

UNITED STATES PATENTS

| | | |
|---|---|---|
| 390,094 | Pendergast et al. | Sept. 25, 1888 |
| 470,496 | Le Grand | Mar. 8, 1892 |
| 813,656 | Lyons | Feb. 27, 1906 |
| 1,533,351 | Genest | Apr. 14, 1925 |
| 2,438,320 | Kingston | Mar. 23, 1948 |
| 2,441,390 | Boeddinghaus | May 11, 1948 |
| 2,448,441 | Kingston | Aug. 31, 1948 |
| 2,496,873 | Hoffman | Feb. 7, 1950 |
| 2,616,154 | Boeddinghaus et al. | Nov. 4, 1952 |
| 2,890,496 | Williams | June 16, 1959 |